(12) United States Patent
Sanaat et al.

(10) Patent No.: US 11,150,360 B2
(45) Date of Patent: Oct. 19, 2021

(54) ALTERING PATHS OF OPTICAL PHOTONS PASSING THROUGH A SCINTILLATOR

(71) Applicants: Amirhossein Sanaat, Tehran (IR); Mohammad Reza Ay, Tehran (IR); Mohammad Hossein Farahani, Tehran (IR); Saeed Sarkar, Tehran (IR)

(72) Inventors: Amirhossein Sanaat, Tehran (IR); Mohammad Reza Ay, Tehran (IR); Mohammad Hossein Farahani, Tehran (IR); Saeed Sarkar, Tehran (IR)

(73) Assignee: PARTO NEGAR PERSIA (PNP) COMPANY, Tehran (IR)

(*) Notice: Subject to any disclaimer, the term of this patent is extended or adjusted under 35 U.S.C. 154(b) by 162 days.

(21) Appl. No.: 16/533,820

(22) Filed: Aug. 7, 2019

(65) Prior Publication Data

US 2019/0361132 A1 Nov. 28, 2019

Related U.S. Application Data

(60) Provisional application No. 62/716,354, filed on Aug. 8, 2018.

(51) Int. Cl.
*G01T 1/20* (2006.01)
*G01T 1/161* (2006.01)

(52) U.S. Cl.
CPC ............ *G01T 1/2002* (2013.01); *G01T 1/161* (2013.01)

(58) Field of Classification Search
CPC ...... G01T 1/2002; G01T 1/161; G01T 1/2018
See application file for complete search history.

(56) References Cited

U.S. PATENT DOCUMENTS

2016/0073983 A1* 3/2016 Miyazaki ............... A61B 6/482
250/369

FOREIGN PATENT DOCUMENTS

CN 102655813 * 9/2012 ........... G01T 1/2002

* cited by examiner

*Primary Examiner* — David P Porta
*Assistant Examiner* — Meenakshi S Sahu
(74) *Attorney, Agent, or Firm* — Bajwa IP Law Firm; Haris Zaheer Bajwa

(57) ABSTRACT

A method for altering paths of optical photons that pass through a scintillator. The scintillator includes a plurality of vertical sides. The method includes forming a reflective belt inside the scintillator by creating a portion of the reflective belt inside the scintillator on a vertical plane parallel with a vertical side of the plurality of vertical sides. Creating the portion of the reflective belt includes generating a plurality of defects on the vertical plane.

19 Claims, 7 Drawing Sheets

11,150,360 B2

ALTERING PATHS OF OPTICAL PHOTONS PASSING THROUGH A SCINTILLATOR

CROSS-REFERENCE TO RELATED APPLICATION

This application claims the benefit of priority from U.S. Provisional Patent Application Ser. No. 62/716,354, filed on Aug. 8, 2018, and entitled "MONOLITHIC SCINTILLATION CRYSTAL EQUIPPED A BELT OF SPHERICAL REFLECTORS," which is incorporated herein by reference in its entirety.

TECHNICAL FIELD

The present disclosure generally relates to nuclear radiation, and particularly, to nuclear imaging.

BACKGROUND

Radiation is used to acquire images in a variety of imaging systems, such as nuclear medicine that images internal organs of a human body. Radiopharmaceuticals are, generally, introduced into the body, either by injection or ingestion, and produce emissions of annihilation photons (such as gamma photons) emissions that originate from the body. Several detectors may be used to detect emitted annihilation photons and data collected from the detectors may be processed to locate a source of each of the emitted photons. An image may be produced by accumulating a large number of detected locations.

Scintillation crystals are commonly used in imaging systems that utilize radiation emitting materials. These crystals may emit visible light pulses when a high energy radiation (like annihilation photons) passes through the crystals. The pulses of emitted light (i.e., optical photons) may be detected by a photosensitive detector. Crystal surfaces may be coated with reflectors to direct light through internal reflections towards the photosensitive detector. However, significant losses of scintillation light may occur due to photon interactions with the crystal surfaces or reflective coatings on those surfaces. As a result, only a fraction of the scintillation light produced in the crystal may reach the photosensitive detector.

There is, therefore, a need for a method for increasing an amount of scintillation light that reaches a photosensitive detector. There is further a need for a processed scintillation crystal that is able to direct more optical photons towards a photosensitive detector.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for altering paths of optical photons that pass through a scintillator. The scintillator may include a plurality of vertical sides. An exemplary method may include forming a reflective belt inside the scintillator by creating a portion of the reflective belt inside the scintillator on a vertical plane parallel with a vertical side of the plurality of vertical sides. In an exemplary embodiment, creating the portion of the reflective belt may include generating a plurality of defects on the vertical plane.

In an exemplary embodiment, generating the plurality of defects may include generating the plurality of defects in a rectangular shape. In an exemplary embodiment, generating the plurality of defects in the rectangular shape may include determining a width of the rectangular shape, determining a vertical distance of a center of the rectangular shape from a top surface of the scintillator, and determining a horizontal distance of the rectangular shape from the vertical side based on optimal values for a sensitivity and a spatial resolution of a photosensitive detector. In an exemplary embodiment, the photosensitive detector may be associated with the scintillator.

In an exemplary embodiment, generating the plurality of defects may further include obtaining a curved surface by curving a surface of the rectangular shape. In an exemplary embodiment, the curved surface may include an elliptic curve on a side of the curved surface. The elliptic curve may include a center, a minor axis, and a major axis. In an exemplary embodiment, obtaining the curved surface may further include determining a location of the center of the elliptic curve, determining the minor axis, determining the major axis, and determining a width of the curved profile based on optimal values for a sensitivity and a spatial resolution of the photosensitive detector.

In an exemplary embodiment, creating the reflective belt inside the scintillator may include creating the reflective belt inside a monolithic crystal. In an exemplary embodiment, generating the plurality of defects may include generating each of the plurality of defects in a spherical shape by engraving a subsurface of the vertical plane utilizing a laser beam.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and apparatus for directing optical photons that are created inside a scintillation crystal to a photosensitive detector. The optical photons may be created from an annihilation photon that passes through the crystal. A reflective belt may be engraved inside the crystal to reflect scintillation lights towards the photosensitive detector. The reflective belt may have a rectangular surface or a curved surface. Specifications of the reflective belt may be determined based on a desired sensitivity and spatial resolution of the detector. An exemplary apparatus may be utilized in various imaging techniques that exploit radioactive materials as sources of radiation of annihilation photons (such as gamma photons). Examples of such techniques include positron emission tomography (PET), single photon emission computed tomography (SPECT), computed tomography (CT), etc.

Figure 1A:
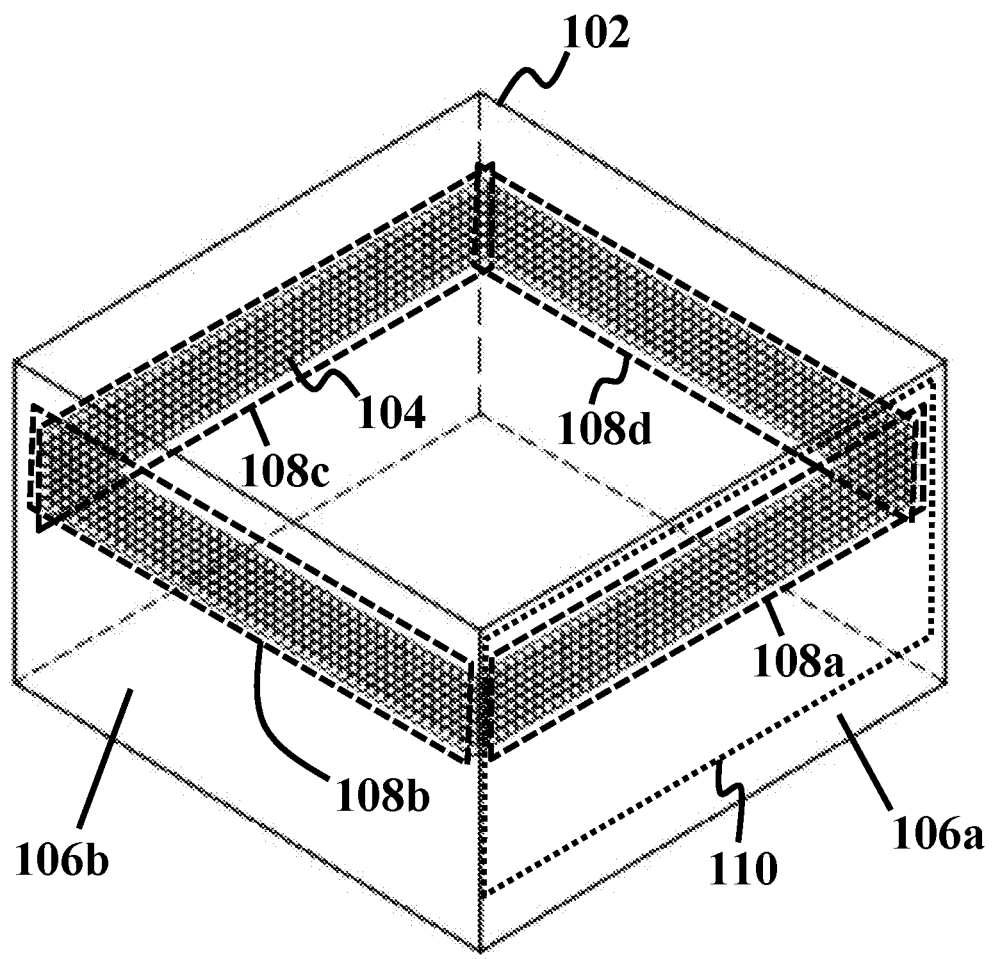
FIG. 1A shows a schematic of an apparatus for altering paths of optical photons, consistent with one or more exemplary embodiments of the present disclosure.

FIG. 1A shows a schematic of an apparatus for altering paths of optical photons, consistent with one or more exemplary embodiments of the present disclosure. An exemplary apparatus 100 may include a scintillator 102 and a reflective belt 104. In an exemplary embodiment, scintillator 102 may include a monolithic crystal. In an exemplary embodiment, scintillator 102 may include a plurality of vertical sides (including sides 106a and 106b in FIG. 1A). In an exemplary embodiment, scintillator 102 may be configured to convert annihilation photons to optical photons by annihilating the annihilation photons which enter scintillator 102 at an annihilation point. In an exemplary embodiment, the annihilation point may be a point annihilation photons may lose enough energy after passing through scintillator 102 to be annihilated and generate optical photons. In an exemplary embodiment, the annihilation photons may be emitted from a radioactive material.

In an exemplary embodiment, reflective belt 104 may be located inside scintillator 102 and may include a plurality of portions (including portions 108a, 108b, 108c, and 108d in FIG. 1A). In an exemplary embodiment, a portion 108a of plurality of portions may be created inside scintillator 102 on a vertical plane 110 that may be parallel with a vertical side 106a of the plurality of vertical sides. In an exemplary embodiment, portion 108a may include a plurality of defects which may be generated on vertical plane 110. In an exemplary embodiment, each of the plurality of defects may have an approximately spherical shape.

Figure 1B:
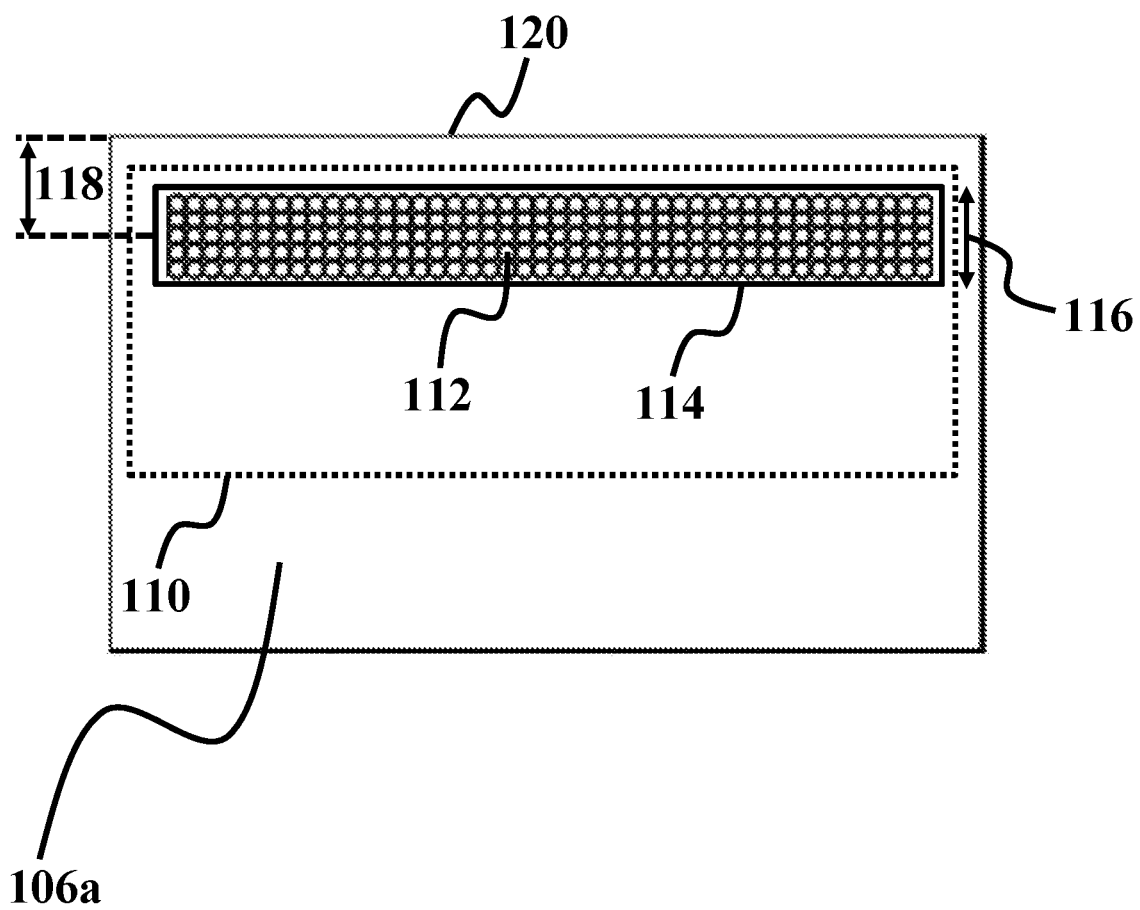
FIG. 1B shows a schematic of a side view of an apparatus for altering paths of optical photons, consistent with one or more exemplary embodiments of the present disclosure.

FIG. 1B shows a schematic of a side view of apparatus 100, consistent with one or more exemplary embodiments of the present disclosure. Referring to FIGS. 1A and 1B, in an exemplary embodiment, a method may be utilized for altering paths of optical photons that pass through scintillator 102. An exemplary method may include forming reflective belt 104 inside scintillator 102 by creating portion 108a of reflective belt 104 inside scintillator 102 on vertical plane 110. In an exemplary embodiment, creating portion 108a may include generating a plurality of defects 112 on vertical plane 110. In an exemplary embodiment, plurality of defects 112 may be engraved on a portion of scintillator 102 that may be located on vertical plane 110 utilizing a laser beam.

In an exemplary embodiment, different engraving methods may be utilized to generate plurality of defects 112, such as subsurface laser engraving (SSLE) or laser-induced optical barriers (LIOB) methods. In these methods, one or more laser beams may be emitted to a specific point determined by an operator. By releasing laser beam energy to that point, a localized heat may be generated which may result in a deformation of a molecular arrangement in a small region around the point. In an exemplary embodiment, the region may be deformed in an approximately spherical form. In an exemplary embodiment, changes in molecular structures and crystalline networks may cause a change in a refractive index of changed regions. In an exemplary embodiment, the change in the refractive index may cause scattering of optical photons produced inside scintillator 102, thereby causing plurality of defects 112 to act as an inner reflector. As a result, the path of the optical photons passing through the scintillator 102 may be altered after meeting reflective belt 104.

In an exemplary embodiment, generating plurality of defects 112 may include generating plurality of defects 112 in a rectangular shape 114. In an exemplary embodiment, generating plurality of defects 112 in rectangular shape 114 may include determining a width 116 of rectangular shape 114 and a vertical distance 118 of a center of rectangular shape 114 from a top surface 120 of scintillator 102.

Figure 1C:
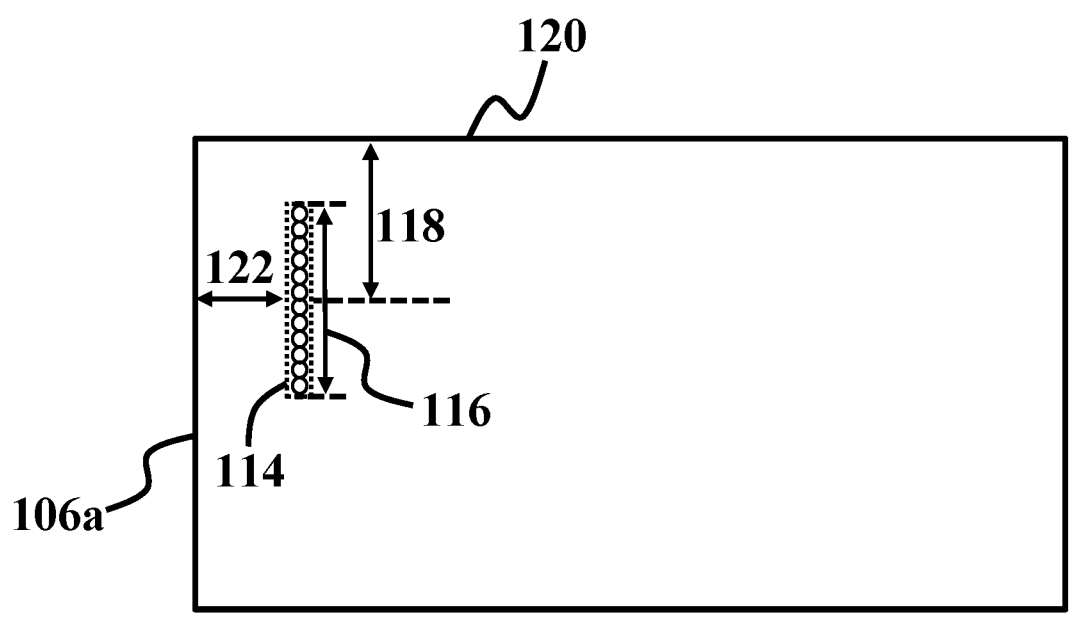
FIG. 1C shows a schematic of a side view of a rectangular shape, consistent with one or more exemplary embodiments of the present disclosure.

FIG. 1C shows a schematic of a side view of rectangular shape 114, consistent with one or more exemplary embodiments of the present disclosure. In an exemplary embodiment, generating plurality of defects 112 in rectangular shape 114 may further include determining a horizontal distance 122 of rectangular shape 114 from vertical side 106a.

Figure 1D:
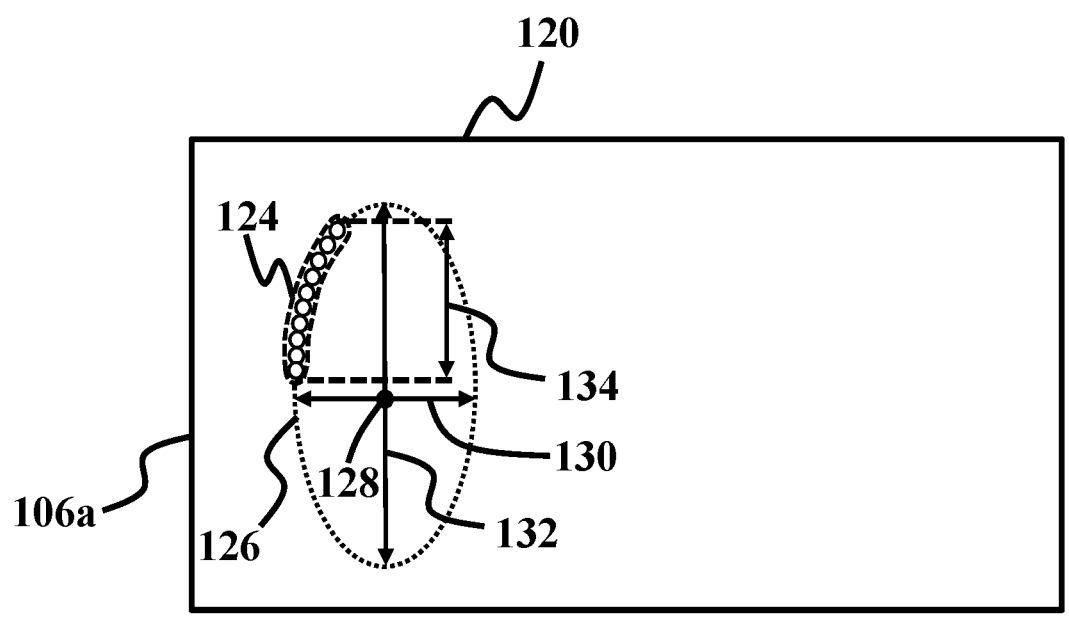
FIG. 1D shows a schematic of a side view of a curved surface, consistent with one or more exemplary embodiments of the present disclosure.

FIG. 1D shows a schematic of a side view of a curved surface, consistent with one or more exemplary embodiments of the present disclosure. Referring to FIGS. 1C and 1D, in an exemplary embodiment, generating plurality of defects 112 in rectangular shape 114 may further include obtaining a curved surface 124 by curving a surface of plurality of defects 112 in rectangular shape 114 according to a curved profile. In an exemplary embodiment, the curved profile may refer to the shape of the surface of rectangular shape 114 from the side view. In other words, curved surface 124 may conform to a segment of the curved profile. In an exemplary embodiment, the curved profile may include an elliptic curve 126. In an exemplary embodiment, elliptic curve 126 may include a center 128, a minor axis 130, and a major axis 132. In an exemplary embodiment, curving the surface of rectangular shape 114 may further include determining a location of center 128 of elliptic curve 126, minor axis 130, major axis 132, and a width 134 of curved surface 124. In an exemplary embodiment, determining the location of center 128 may include determining distances of center 128 from top surface 120 and vertical side 106a. In an exemplary embodiment, determining minor axis 130 and major axis 132 of elliptic curve 126 may include determining lengths and orientations of these axes. In an exemplary embodiment, elliptic curve 126 may be located on a plane perpendicular to vertical side 106a.

Figure 2:
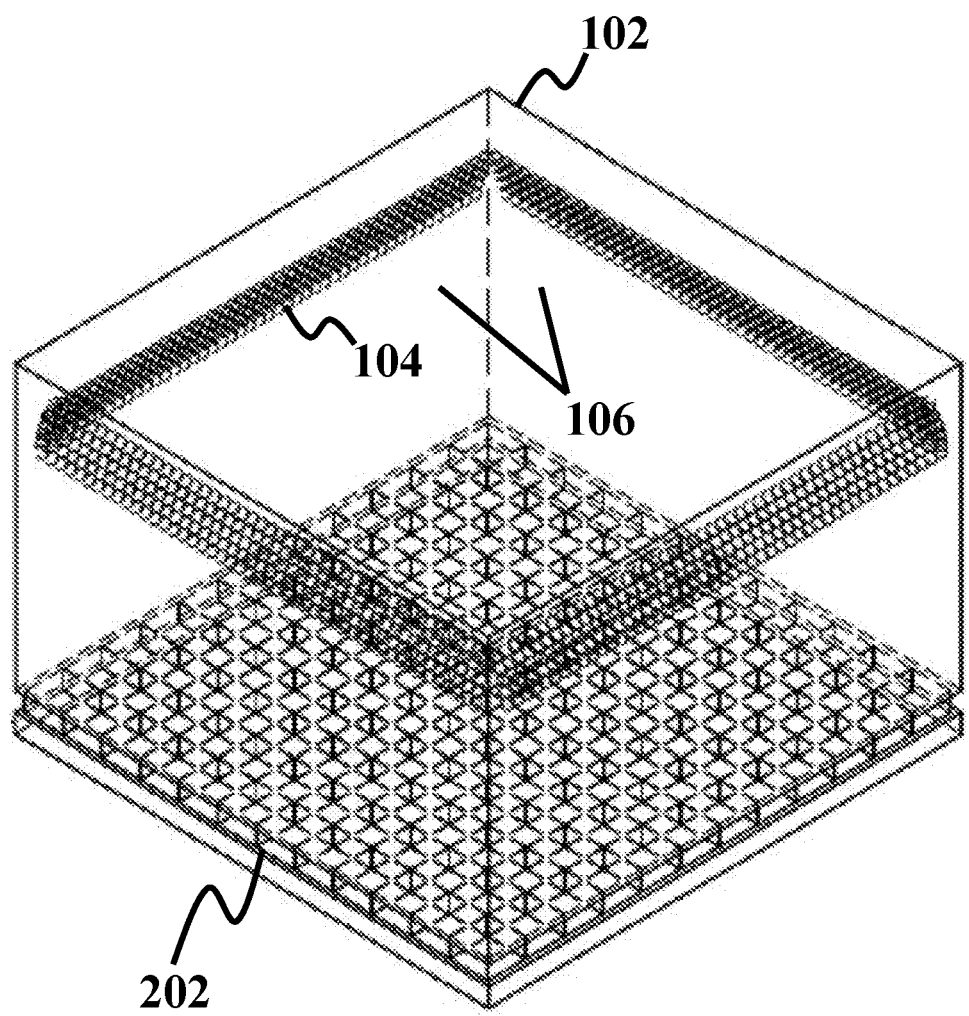
FIG. 2 shows a schematic of an apparatus placed on a photosensitive detector, consistent with one or more exemplary embodiments of the present disclosure.

FIG. 2 shows a schematic of an apparatus placed on a photosensitive detector, consistent with one or more exemplary embodiments of the present disclosure. In an exemplary embodiment, a photosensitive detector 202 may be associated with scintillator 102. In an exemplary embodiment, photosensitive detector 202 may be placed under apparatus 100. In an exemplary embodiment, each of plurality of vertical sides may be perpendicular to a surface of photosensitive detector 202. In an exemplary embodiment, photosensitive detector 202 may be configured to convert optical photons to electrical signals.

In an exemplary embodiment, photosensitive detector 202 performance may be evaluated based on its sensitivity and spatial resolution. In an exemplary embodiment, a ratio of optical photons converted to electrical signals by photosensitive detector 202 to a total number of optical photons that may be created from annihilation photons entering scintillator 102 may be referred to as the sensitivity of photosensitive detector 202. Therefore, increasing the number of optical photons that reach photosensitive detector 202 may increase the number of conversions and consequently the sensitivity of photosensitive detector 202. In an exemplary embodiment, a minimum distance between two different annihilation points that may be recognized by detecting respective optical photons reaching photosensitive detector 202 may be referred to as the spatial resolution of photosensitive detector 202. Since light rays associated with the optical photons may diverge as they pass through scintillator 102, shortening a path that an optical photon may pass before reaching photosensitive detector 202 may enhance the spatial resolution. In an exemplary embodiment, the optical photon's path may be shortened by decreasing a depth of scintillator 102. However, this approach may also decrease a distance that an annihilation photon may pass through scintillator 102 before exiting scintillator 102, which may decrease a probability of the conversion of the annihilation photon to optical photons, thereby decreasing the sensitivity. Therefore, in an exemplary embodiment, there may be a tradeoff in determining different design aspects of apparatus 100 to obtain optimal values for the sensitivity and the spatial resolution.

Referring to FIGS. 1B-2, in an exemplary embodiment, width 116, vertical distance 118, and horizontal distance 122 may be determined based on optimal values for the sensitivity and the spatial resolution of photosensitive detector 202. In an exemplary embodiment, variations of the sensitivity and the spatial resolution with respect to variations of each of width 116, vertical distance 118, and horizontal distance 122 may be obtained and values of width 116, vertical distance 118, and horizontal distance 122 that correspond to desired values of the sensitivity and/or the spatial resolution may be selected as the determined values of width 116, vertical distance 118, and horizontal distance 122. In an exemplary embodiment, the location of center 128, minor axis 130, major axis 132, and width 134 of curved surface 124 may also be determined based on the optimal values for the sensitivity and the spatial resolution of photosensitive detector 202. In an exemplary embodiment, variations of the sensitivity and the spatial resolution with respect to variations of each of the location of center 128, minor axis 130, major axis 132, and width 134 may be obtained and values of the location of center 128, minor axis 130, major axis 132, and width 134 that correspond to desired values of the sensitivity and/or the spatial resolution may be selected as the determined values of the location of center 128, minor axis 130, major axis 132, and width 134. In an exemplary embodiment, the desired values of the sensitivity and the spatial resolution of photosensitive detector 202 may include values that are higher than about 0.9 of maximum values of the sensitivity and/or the spatial resolution.

Figure 3:
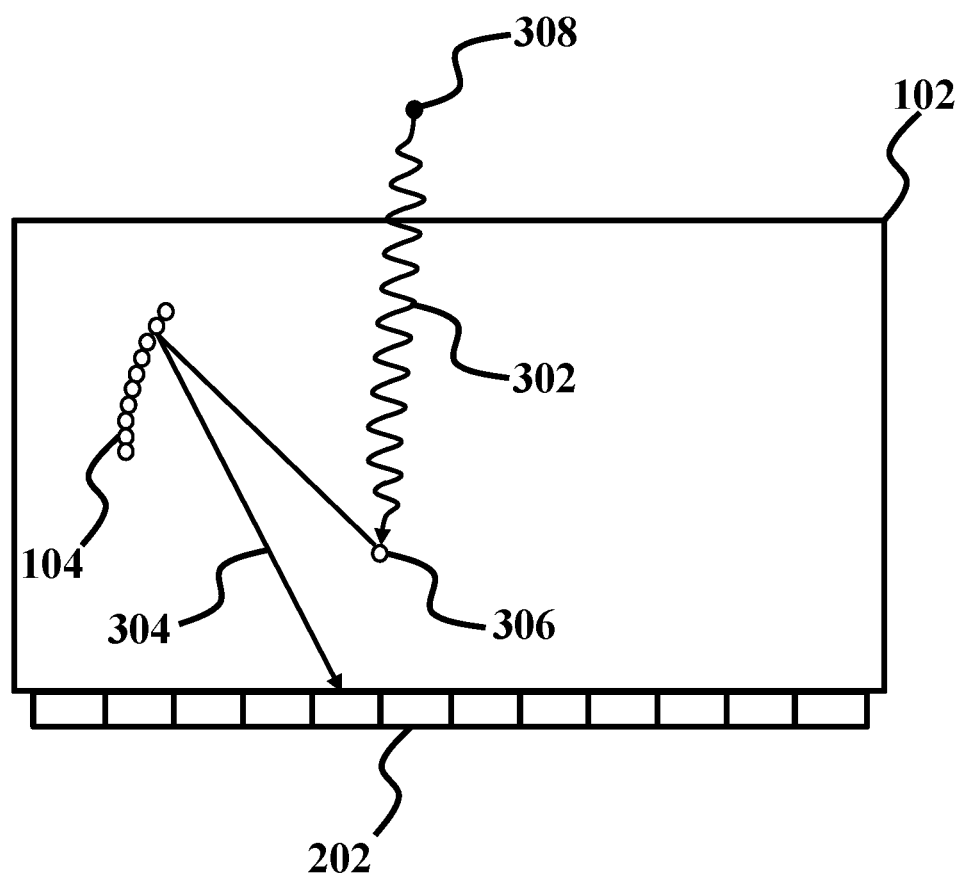
FIG. 3 shows a schematic of a side view of an imaging system, consistent with one or more exemplary embodiments of the present disclosure.

FIG. 3 shows a schematic of a side view of an imaging system, consistent with one or more exemplary embodiments of the present disclosure. In an exemplary embodiment, different elements of apparatus 100 may be utilized in an imaging system 300. In an exemplary embodiment, imaging system 300 may include a medical imaging system, such as a PET, a SPECT, or a CT.

In an exemplary embodiment, imaging system 300 may include scintillator 102, photosensitive detector 202, and reflective belt 104. In an exemplary embodiment, scintillator 102 may be configured to receive an annihilation photon 302, convert annihilation photon 302 to an optical photon 304 by annihilating annihilation photon 302 at an annihilation point 306, and emit optical photon 304 from annihilation point 306. In an exemplary embodiment, annihilation photon 302 may be emitted from a radiopharmaceutical 308. In an exemplary embodiment, radiopharmaceutical 308 may include a radioactive material.

In an exemplary embodiment, the conversion of annihilation photon 302 to optical photon 304 may occur due to scintillation phenomena in scintillation crystals. In an exemplary embodiment, a large number of optical photons may be created responsive to the annihilation of annihilation photon 302. However, a single optical photon is illustrated in FIG. 3 to better demonstrate the conversion of annihilation photon 302 to optical photon 304.

In an exemplary embodiment, photosensitive detector 202 may be configured to convert optical photon 304 to an electrical signal. In an exemplary embodiment, reflective belt 104 may be configured to reflect optical photon 304 towards photosensitive detector 202.

Example 1

In this example, an imaging system with a scintillator equipped with a rectangular reflective belt is demonstrated. An exemplary imaging system includes a lutetium-yttrium oxyorthosilicate (LYSO) scintillation monolithic crystal coupled to an exemplary photosensitive detector (analogous to photosensitive detector 202) and a rectangular reflective belt (analogous to reflective belt 104). The volume of the LYSO crystal is about $50.2 \times 50.2 \times 20$ mm$^3$. The photosensitive detector includes $12 \times 12$ light-sensitive cells and the thickness of the reflective belt is about 100 micrometers.

The first step for creating the rectangular reflective is placing the monolithic crystal inside a holder for decreasing probable movements. In the next step, a laser system is utilized to create the reflective belt by sending commands to laser engagement arms. The arms move in three dimensions, and consequently, points of the reflective belt are carved into the crystal. After creating the reflective belt, the crystal surface except the face opposite of the photosensitive detector is wrapped in a reflective sheet-like aluminum or barium sulfate sheet.

After carving the reflective belt with an initial set of specifications, the Monte Carlo simulation is used for evaluation and optimization of the designed reflective belt. The simulation is be performed based on GEANT4 and GATE. Next, the sensitivity and the spatial resolution are measured according to the international standard NEMA NU 4-2008. The design process is then repeated for different sets of specifications, and a set of specifications for the rectangular reflective belt corresponding to optimal values of the sensitivity and the spatial resolution is selected as optimal specifications of the rectangular reflective belt to achieve a high-quality image in terms of optimal values for the spatial resolution and the sensitivity of the photosensitive detector. The optimal specifications of the rectangular reflective belt include a width (analogous to width 116) of about 8.6 mm and a center located at a depth (analogous to vertical distance 118) of about 37.8 mm from the crystal top surface (analogous to top surface 120).

Example 2

In this example, a performance of an imaging system with a scintillator equipped with a curved reflective belt is evaluated. An exemplary imaging system, similar to the imaging system of EXAMPLE 1 is implemented, except of being equipped with a curved reflective belt with a surface that is curved according to an elliptic profile (analogous to curved surface 124). The elliptic profile includes a major axis (analogous to major axis 132) and a minor axis (analogous to minor axis 130). In order to find optimized major and minor axes, a Monte Carlo simulation is used.

Figure 4:
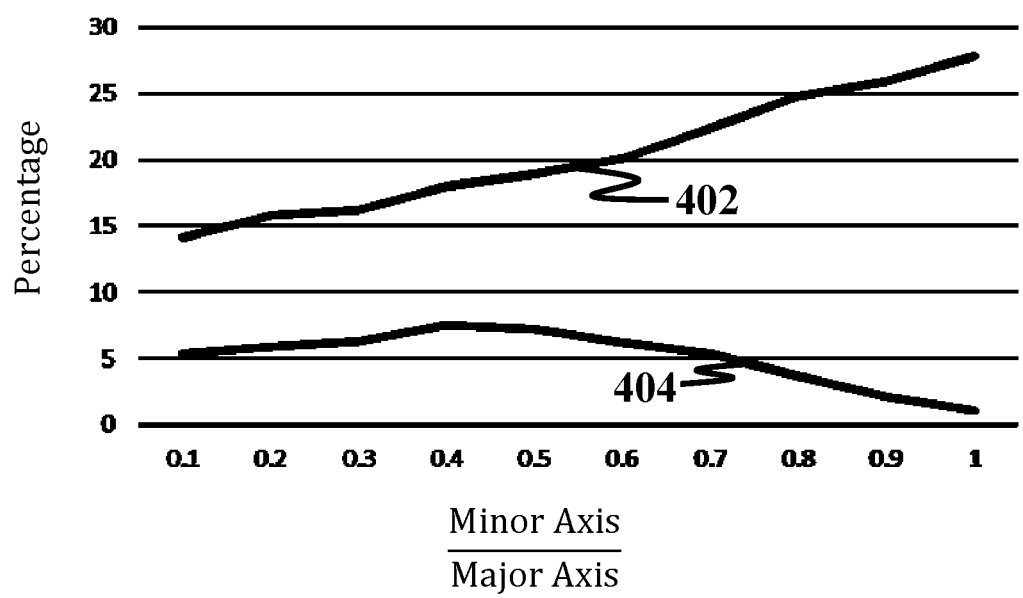
FIG. 4 shows variations of a spatial resolution and a sensitivity of an imaging system with an elliptic reflective belt for different ratios of a minor axis length to a major axis length of an elliptic profile, consistent with one or more exemplary embodiments of the present disclosure.

FIG. 4 shows variations of the spatial resolution and the sensitivity of the imaging system for different ratios of the minor axis length to the major axis length of the elliptic profile, consistent with one or more exemplary embodiments of the present disclosure. As shown in FIG. 4, a sensitivity 402 increases as the ratio of the minor axis length to the major axis length increases. In other words, increasing the ratio of the minor axis length to the major axis length increases a number of optical photons that reach an exemplary photosensitive detector.

A spatial resolution 404 increases with the increase in the ratio of the minor axis length to the major axis length until the ratio reaches about 0.4, at which spatial resolution 404 is maximized. Increasing the ratio above 0.4 decreases spatial resolution 404. Therefore, an optimal value for the ratio is obtained about 0.4, which results in a spatial resolution of about 7.6%.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for altering paths of optical photons passing through a scintillator comprising a plurality of vertical sides, the method comprising forming a reflective belt inside the scintillator by creating a portion of the reflective belt inside the scintillator on a vertical plane parallel with a vertical side of the plurality of vertical sides, wherein creating the portion of the reflective belt comprises generating a plurality of defects in a rectangular shape on the vertical plane by determining a width of the rectangular shape, determining a vertical distance of a center of the rectangular shape from a top surface of the scintillator, and determining a horizontal distance of the rectangular shape from the vertical side based on optimal values for a sensitivity and a spatial resolution of a photosensitive detector associated with the scintillator.

2. The method of claim 1, wherein generating the plurality of defects further comprises obtaining a curved surface by curving a surface of the plurality of defects.

3. The method of claim 2, wherein obtaining the curved surface comprises obtaining an elliptic curve on a side of the curved surface, the elliptic curve comprising a center of the elliptic curve, a minor axis, and a major axis.

4. The method of claim 3, wherein obtaining the curved surface further comprises determining a location of the center of the elliptic curve, determining the minor axis, determining the major axis, and determining a width of the curved surface based on the optimal values for the sensitivity and the spatial resolution of the photosensitive detector.

5. The method of claim 1, wherein creating the reflective belt inside the scintillator comprises creating the reflective belt inside a monolithic crystal.

6. The method of claim 1, wherein generating the plurality of defects comprises generating each of the plurality of defects in a spherical shape by engraving a portion of the scintillator on the vertical plane utilizing a laser beam.

7. An apparatus for altering paths of optical photons, the apparatus comprising:
  a scintillator comprising a plurality of vertical sides; and
  a reflective belt located inside the scintillator, the reflective belt comprising a plurality of portions, a portion of the plurality of portions created inside the scintillator on a vertical plane parallel with a vertical side of the plurality of vertical sides, the portion comprising a plurality of defects comprising a rectangular shape generated on the vertical plane, wherein the rectangular shape comprises a width and a center, each of the width, a vertical distance of the center from a top surface of the scintillator, and a horizontal distance of the rectangular shape from the vertical side determined based on optimal values for a sensitivity and a spatial resolution of a photosensitive detector associated with the scintillator.

8. The apparatus of claim 7, wherein a surface of the plurality of defects comprises a curved surface.

9. The apparatus of claim 8, wherein the curved surface comprises an elliptic curve on a side of the curved surface, the elliptic curve comprising a center of the elliptic curve, a minor axis, and a major axis.

10. The apparatus of claim 9, wherein each of the minor axis, the major axis, a location of the center of the elliptic curve, and a width of the surface are determined based on the optimal values for the sensitivity and the spatial resolution of the photosensitive detector.

11. The apparatus of claim 7, wherein the scintillator comprises a monolithic crystal.

12. The apparatus of claim 7, wherein the plurality of defects are engraved on a subsurface of the vertical plane, each of the plurality of defects comprising a spherical shape.

13. An imaging system, comprising:
  a monolithic scintillation crystal comprising a plurality of vertical sides, the monolithic scintillation crystal configured to:
    receive an annihilation photon emitted from a radiopharmaceutical;
    convert the annihilation photon to an optical photon by annihilating the annihilation photon at an annihilation point; and
    emit the optical photon from the annihilation point;
  a photosensitive detector configured to convert the optical photon to an electrical signal; and
  a reflective belt placed inside the monolithic scintillation crystal, the reflective belt comprising a plurality of portions, a portion of the plurality of portions created inside the monolithic scintillation crystal on a vertical plane parallel with a vertical side of the plurality of vertical sides, the portion comprising a plurality of defects engraved on a subsurface of the vertical plane, the reflective belt configured to reflect the optical photon towards the photosensitive detector, wherein the plurality of defects comprise a rectangular shape, the rectangular shape comprising a rectangle width and a rectangle center, each of the rectangle width, a vertical distance of the rectangle center from a top surface of the monolithic scintillation crystal, and a horizontal distance of the rectangular shape from the vertical side determined based on optimal values for a sensitivity and a spatial resolution of the photosensitive detector.

14. The imaging system of claim 13, wherein a surface of the plurality of defects comprises an elliptic curve on a side of the surface, the elliptic curve comprising a curve center, a minor axis, and a major axis, each of the minor axis, the major axis, a location of the curve center, and a width of the curved surface determined based on the optimal values for the sensitivity and the spatial resolution of the photosensitive detector.

15. The imaging system of claim 13, further comprising a medical imaging system, the medical imaging system comprising one of a positron emission tomography (PET), a single photon emission computed tomography (SPECT), or a computed tomography (CT).

16. The method of claim 4, wherein determining the minor axis and determining the major axis comprise setting a ratio of a length of the minor axis to a length of the major axis to a value between 0.4 and 0.5.

17. The apparatus of claim 10, wherein a ratio of a length of the minor axis to a length of the major axis is equal to a value between 0.4 and 0.5.

18. The imaging system of claim 13, wherein each of the plurality of defects comprises a spherical shape.

19. The imaging system of claim 14, wherein a ratio of a length of the minor axis to a length of the major axis is equal to a value between 0.4 and 0.5.

\* \* \* \* \*